(12) United States Patent
Rogacs et al.

(10) Patent No.: US 11,325,123 B2
(45) Date of Patent: May 10, 2022

(54) FLOW REGULATION IN FLUIDIC SYSTEMS USING A PHASE-CHANGE MATERIAL AT SYSTEM PORTS

(71) Applicant: The Board of Trustees of the Leland Stanford Junior University, Palo Alto, CA (US)

(72) Inventors: Anita Rogacs, Redwood City, CA (US); Juan G. Santiago, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 744 days.

(21) Appl. No.: 14/450,069

(22) Filed: Aug. 1, 2014

(65) Prior Publication Data

US 2015/0037784 A1 Feb. 5, 2015

Related U.S. Application Data

(60) Provisional application No. 61/861,602, filed on Aug. 2, 2013.

(51) Int. Cl.
*B01L 3/00* (2006.01)
*F16K 99/00* (2006.01)

(52) U.S. Cl.
CPC .... *B01L 3/502746* (2013.01); *F16K 99/0032* (2013.01); *B01L 2300/0816* (2013.01); *B01L 2300/0883* (2013.01); *B01L 2300/14* (2013.01); *B01L 2400/084* (2013.01)

(58) Field of Classification Search
CPC ......... F16K 99/0032; B01L 2400/0677; B01L 3/502746; B01L 2300/14; B01L 2400/084
See application file for complete search history.

(56) References Cited

U.S. PATENT DOCUMENTS

| 6,669,831 | B2 | 12/2003 | Chow et al. |
| 7,204,263 | B2 | 4/2007 | Tsukita et al. |
| 7,694,694 | B2 | 4/2010 | Welle |
| 7,875,160 | B2 | 1/2011 | Jary |
| 7,926,514 | B2* | 4/2011 | Park .................. B01L 3/502738 137/828 |
| 2003/0138941 | A1* | 7/2003 | Gong .................... B01L 3/5027 435/287.2 |
| 2006/0094119 | A1* | 5/2006 | Ismagilov ........... B01F 13/0071 436/55 |

(Continued)

OTHER PUBLICATIONS

Oh et al., "A review of microvalves", 2006, pp. R13-R39, J. Micromech. Microeng. v16.

(Continued)

*Primary Examiner* — Jennifer Wecker
*Assistant Examiner* — Michelle Adams
(74) *Attorney, Agent, or Firm* — Lumen Patent Firm (57) ABSTRACT

Control of fluid flow in a fluidic network is provided by controlling phase transitions of a phase-change material between a liquid phase and a non-fluid phase. The phase-change material is disposed at ports of the fluidic network where the fluidic network is in communication with an ambient. This advantageously provides control of pressure-driven flow within the fluidic network without altering properties of fluids within the fluidic network.

7 Claims, 6 Drawing Sheets

(56) References Cited

U.S. PATENT DOCUMENTS

| | | | |
|---|---|---|---|
| 2009/0264632 A1* | 10/2009 | Sommer | C30B 29/58 |
| | | | 530/418 |
| 2010/0120130 A1* | 5/2010 | Srinivasan | B01F 13/0071 |
| | | | 435/283.1 |
| 2014/0014515 A1 | 1/2014 | Santiago et al. | |
| 2014/0087934 A1* | 3/2014 | Tenreiro | B01L 3/50273 |
| | | | 494/9 |

OTHER PUBLICATIONS

De Volder et al., "Pneumatic and hydraulic microactuators: a review", 2010, pp. 1-18, J. Micromech. Microeng. v20.

Eddington et al., "Flow control with hydrogels", 2004, pp. 199-210, Advanced Drug Delivery Reviews v56.

Nge et al., "Advances in Microfluidic Materials, Functions, Integration, and Applications", 2013, Chem. Rev. 113, 2550-2583.

Fredrickson et al., "Macro-to-micro interfaces for microfluidic devices", 2004, Lab Chip 4, 526-533.

\* cited by examiner

FLOW REGULATION IN FLUIDIC SYSTEMS USING A PHASE-CHANGE MATERIAL AT SYSTEM PORTS

CROSS REFERENCE TO RELATED APPLICATIONS

This application claims the benefit of U.S. provisional patent application 61/861,602, filed on Aug. 2, 2013, and hereby incorporated by reference in its entirety.

FIELD OF THE INVENTION

This invention relates to control of fluid flow in a fluidic system.

BACKGROUND

Various approaches have been considered for controlling fluid flow in fluidic and microfluidic systems. Some of these approaches rely on the use of a phase-change material. For example, microvalves making use of a phase-change material for actuating the valves are considered in an article by Oh et al., ("A review of microvalves", J. Micromechanical Microengineering, v16, pp. R13-R39, 2006) and in an article by Eddington et al. ("Flow control with hydrogels", Advanced Drug Delivery Reviews v56, pp 199-210, 2004).

In some cases a phase-change material is used directly as opposed to being an actuator of a valve. For example, Tsukita et al. (U.S. Pat. No. 7,204,263) consider adding a sol-gel material to fluid flowing through a microfluidic system and controlling fluid flow in the fluidic system by stimulating a sol-gel transition from fluid to gel in a channel of the fluidic system. This method induces a hydrodynamic resistance change within the channel of the fluidic network. A similar approach is considered by Chow et al. (U.S. Pat. No. 6,669,831), where a viscosity enhancer is added to an analyte in a fluidic system to provide flow control.

Although direct use of a phase-change material in a fluidic system for flow control can advantageously avoid complexity related to the use of valves and actuators, it can disadvantageously alter the properties of fluids within the fluidic system. In many cases such alteration of fluid properties can undesirably interfere with proper operation of the system. For example, analytical results from a fluidic system may be undesirably altered by the addition of flow control material to the fluid being analyzed.

Accordingly, it would be an advance in the art to provide direct control of fluid flow in a fluidic system with phase-change material without affecting the properties of fluid within the fluidic system.

SUMMARY

We have found that direct control of fluid flow in a fluidic system can be provided by using phase-change material at ports (e.g., input/output nodes) of the fluidic system where it is in communication with the ambient. This is in contrast to using the phase-change material within the fluidic system as in the above-considered conventional examples. Such use of phase-change material at the ports of a fluidic system can provide flow control while advantageously not changing the properties of fluid within the fluidic system.

In microfluidic devices, a typical configuration is to have fluidic channels and/or fluidic chambers connected to input/output nodes (often referred to as reservoirs). Various processes (e.g., transport, separations) can take place in the channels, while the input/output nodes usually provide a source or sink for fluid flow or ions for electromigration. Input/output nodes are distinguished from channels in that input/output nodes are nodes in the fluidic networks which are used to input or output fluids and/or chemical species. Also, analyses are typically performed in channels and chambers, and not in the input/output nodes. In such configurations, undesired small pressure differences at the input/output nodes can lead to undesirable bulk pressure-driven fluid flows in the channels. Such flows can often interfere with separations or analyses, and are therefore usually undesirable. Eliminating such pressure-driven flows by eliminating the relevant pressure differences is usually not easily achieved in practice, since unduly precise control of the pressures would be needed.

The present approach is based on including a phase-change material in or at one or more of the input/output nodes. A transition of the phase-change material from a liquid phase to a non-fluid phase can be used to control fluid flow to/from the input/output nodes, thereby also controlling fluid flow within the channels. For example, in a simple system having one channel connected between two input/output nodes, having the phase-change material in one of the input/output nodes will stop pressure driven fluid flow in the channel when the phase-change material is in its non-fluid phase. Preferably, the non-fluid phase is a gel in order to avoid generating large and possibly destructive mechanical forces within the fluid system as a result of the phase change. Also, gel phases are able to provide ion buffering and can accommodate Faraday reactions between an electron and species used in the analysis (e.g., water).

An important feature of this approach is that the characteristics of the channels and of fluid in the channels (e.g., hydrodynamic resistance, viscosity, electrical resistance) are not changed by the presence of the phase-change material in the input/output nodes. This advantageously ensures that separations and/or analyses in the channels are unaffected by this approach for preventing pressure driven fluid flow. Another important characteristic is that the phase change allows the material introduced into the input/output node to quickly take the shape of the input/output node region prior to phase change. This makes the process very versatile and able to accommodate to a wide variety of sizes and shapes of input/output nodes. The phase change feature also enables rapid and conformal sealing (to pressure driven flow) of the input/output nodes, even in the presence of an electrode or fluidic connection or connections to/from the input/output node. That is, the phase-change material can conform to the space between a portion of the inlet/outlet conduit (e.g., a wire for electrical current or a tube for species transport), the input/output node walls, and the inlet region of a fluidic channel or channels. Further, the process can be reversible because the phase-change material can be changed back to a liquid phase.

The specific embodiment of a gel as a non-fluid material enables the use of electrical connection nodes in other ways. A gel can be easily prepared to include important chemical species; and these can be available in the fluidic input/output node. For example, for electrokinetic systems these species can include weak electrolyte and titrant species for pH buffering. The input/output nodes can also include, for example, silver ions for silver chloride type standard electrodes. Further, the use of a gel enables sieving or filtering functions to occur at the input/output node.

DETAILED DESCRIPTION

A) General Principles

Figure 1A:
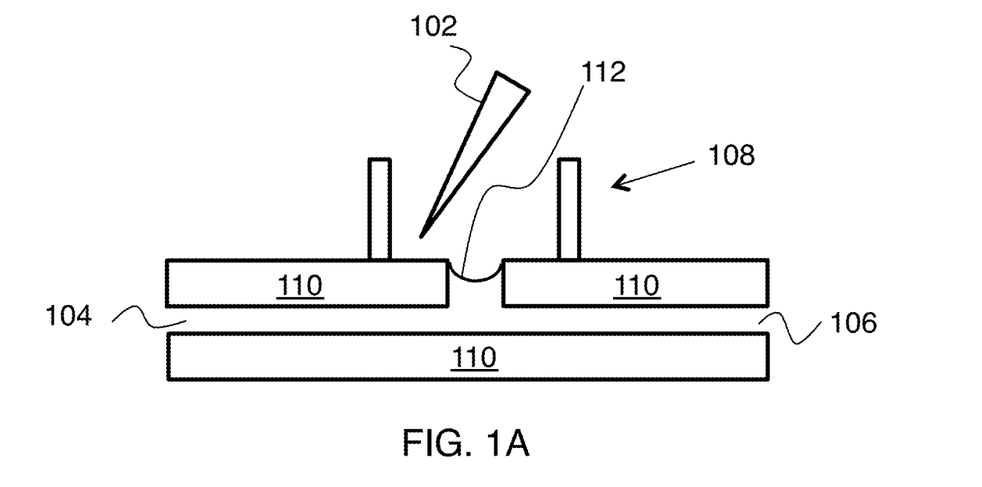
FIGS. 1A-B show operation of a first embodiment of the invention.
Figure 1B:
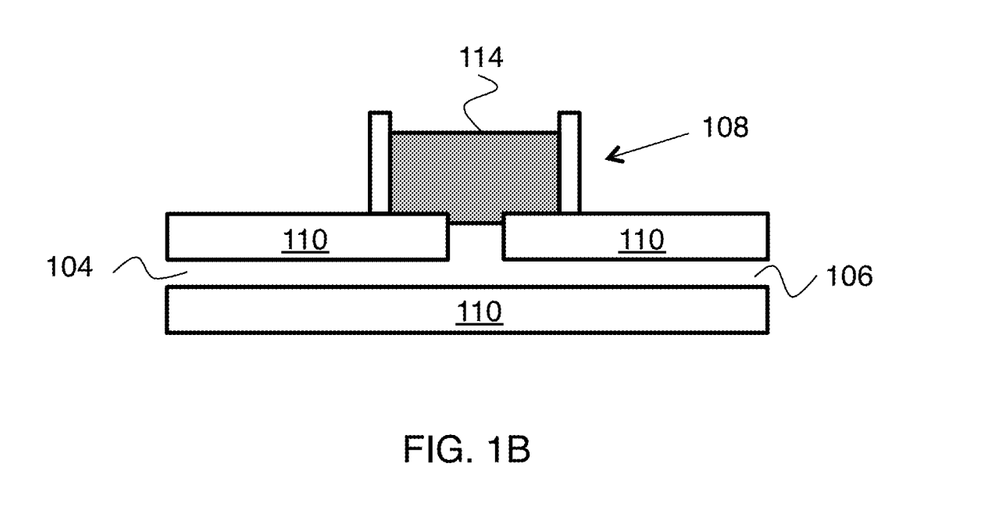
Figure 2A:
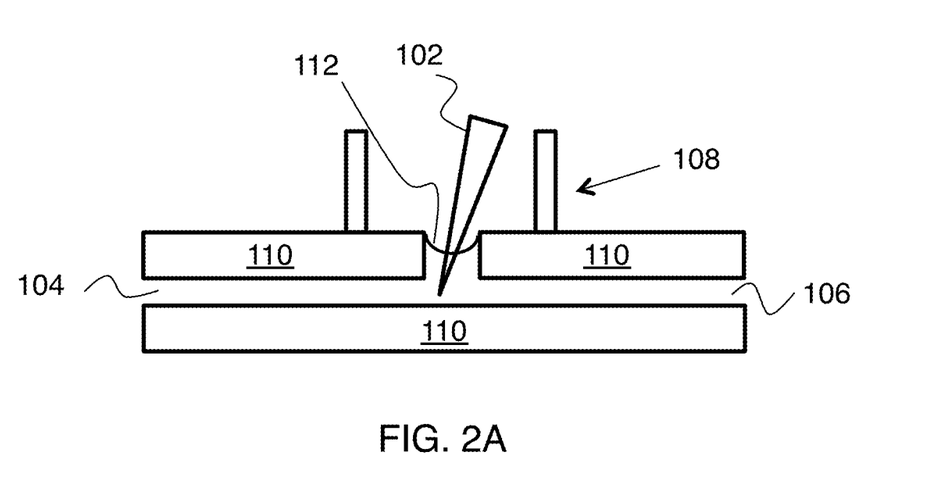
FIGS. 2A-B show operation of a second embodiment of the invention.
Figure 2B:
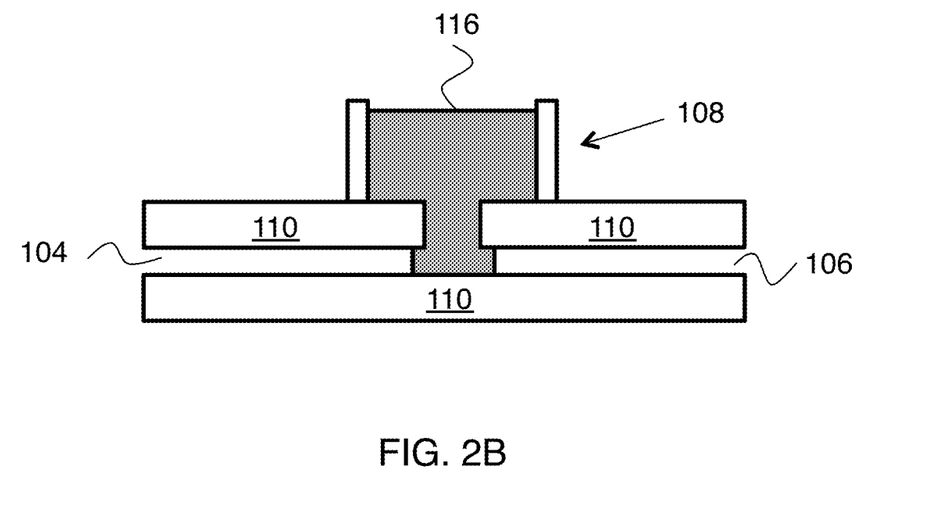

FIGS. 1A-B show operation of a first embodiment of the invention. In this example a microfluidic network formed by substrate 110 has flow channels 104 and 106 connected to a port 108 where the flow network is in communication with an ambient. Schematically, this communication is shown by meniscus 112 on FIG. 1A. A dispenser 102 is configured to deliver a phase-change material to port 108. The apparatus as a whole is configured to control a transition of the phase-change material between a liquid phase and a non-fluid phase. FIG. 1B shows one possible resulting configuration, where non-fluid phase 114 provides a local seal between the microfluidic network and the ambient. The example of FIGS. 2A-B is similar, except that the dispenser is disposed such that the resulting non-fluid phase 116 isolates channels 104 and 106 from each other in addition to providing the local seal between the microfluidic network and the ambient. The non-fluid phase of the phase-change material is preferably a gel.

Practice of the invention does not depend critically on the nature of the dispenser. Any dispenser suitable for dispensing the phase-change material can be employed, such as pipettes etc. Practice of the invention also does not depend critically on the choice of phase-change material. In the specific example considered below, Pluronic® F-127 is employed, but any material capable of changing between liquid and non-fluid phases can be employed.

In general, ports as considered above can be any location where fluid can enter or leave the microfluidic network. For example, input/output nodes where chemical species can enter or leave the flow network are exemplary ports. Preferably the phase-change material is disposed in one or more of the input/output nodes.

Operation of such a system mainly depends on how the transition of the phase-change material between the liquid phase and the non-fluid phase is controlled. One mode of operation is to perform sample analysis in the microfluidic system where the phase-change material is in the non-fluid phase during the sample analysis procedure. This approach can advantageously reduce pressure-driven flow during the sample analysis procedure. An alternative mode of operation is to perform sample analysis in the microfluidic system where the phase-change material is in the liquid phase during the sample analysis procedure. This approach enables pressure-driven flow during the sample analysis procedure.

Such control of pressure driven flow is applicable to any kind of analysis in a microfluidic network, including but not limited to: electrophoresis, isotachophoresis, chromatography, electrochromatography, enzymatic processes, chemical reactions involving one or more species in solution, chemical reactions between a species in solution and a surface-bound species, hybridization, antibody and antigen reactions, optical analyses, electrochemical sensing, and spectral analyses.

Preferably the fluid in the microfluidic network is a liquid. The phase-change material can include pH buffering chemistry. The phase-change material can be dispensed in the liquid phase and subsequently transition to the non-fluid phase. Such a transition can be governed by temperature. For example, the phase-change material can be dispensed at a temperature other than ambient temperature and transition from the liquid phase to the non-fluid phase as its temperature approaches ambient temperature.

Further, the phase-change material can be reversible to reverse the process and convert the non-fluid phase back to a liquid phase. Transition to a liquid phase enables subsequent pressure-driven flow control at the input/output node and/or removal or addition of the phase-change material.

Figure 3:
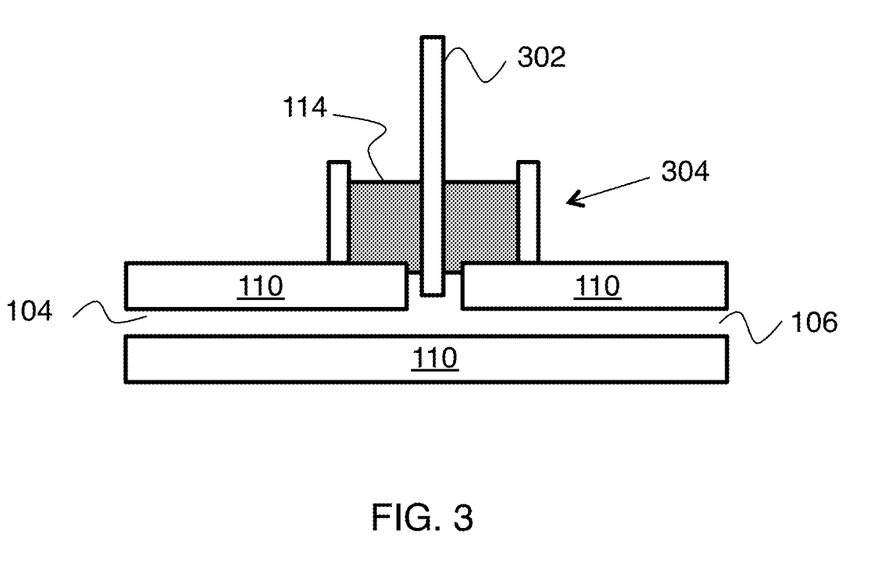
FIG. 3 shows a third embodiment of the invention.

A phase-change material as considered above can be configured to conformally seal around a conduit inserted into the input/output node while also controlling pressure-driven flow in the microfluidic flow network. FIG. 3 shows an example, where non-fluid phase 114 conformally seals around conduit 302 in input/output node 304. Conduit 302 can be an electrode which enables electrical transport into and out of the microfluidic system. In this case, the phase-change material can act as an ion reservoir. Alternatively, conduit 302 can be a tube which enables species transport into and out of the microfluidic system. These approaches provide the capability of connecting a conduit to a microfluidic system through an input/output node while simultaneously preventing undesirable pressure-driven flow effects by locally sealing off the input/output node from the ambient.

Figure 4A:
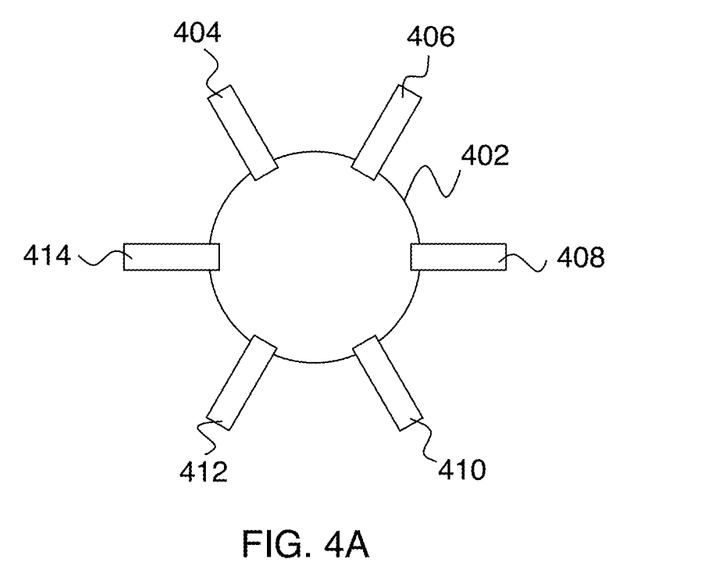
FIGS. 4A-C show examples relating to embodiments of the invention.
Figure 4B:
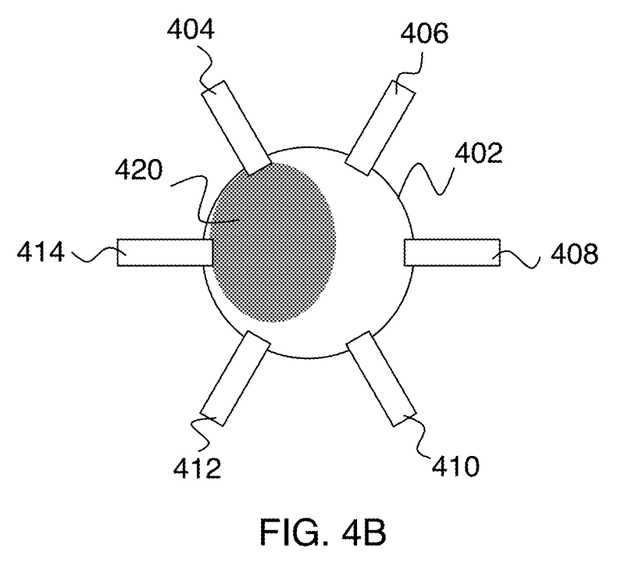
Figure 4C:
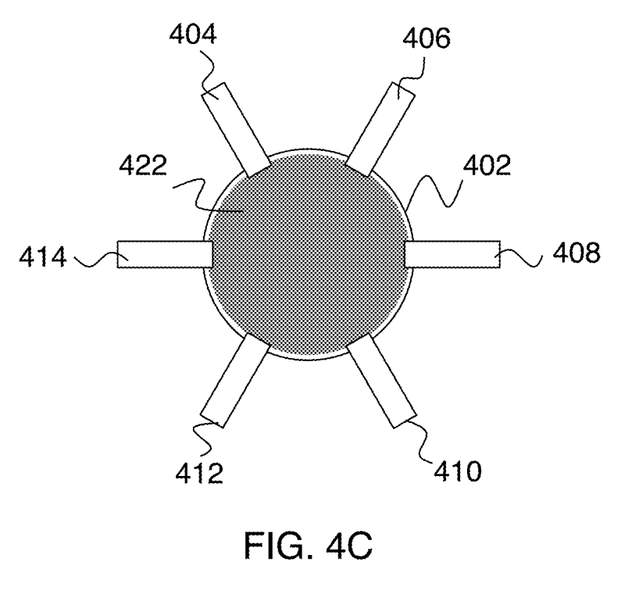
Figures 5A, 5B:
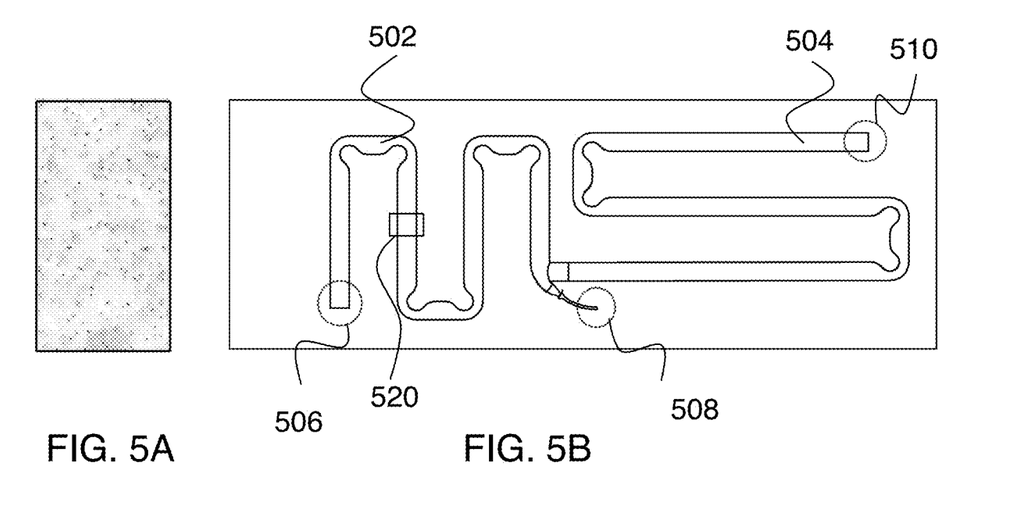
FIG. 5A is an exemplary detector image from an experiment relating to an embodiment of the invention.
FIG. 5B shows the fluidic system for the experiment of FIG. 5A.

In some cases, multiple channels of a microfluidic network are in contact with the same input/output node. FIG. 4A shows an example where channels 404, 406, 408, 410, 412 and 414 are in communication with input/output node 402. Local seals formed by the phase-change material in its non-fluid state can seal some (420 on FIG. 4B) or all (422 on FIG. 4C) of the channels B) Experimental Demonstration This section describes an exemplary experimental demonstration of flow control according to the above-described principles. FIG. 5B shows the experimental arrangement. Here the fluidic system is basically a chip having a single channel loaded on the right with an aqueous buffer solution 504 and loaded on the left with an aqueous bead suspension 502 that is the same as solution 504 except for the addition of the beads. Here the beads are fluorescent particles of 1 um diameter.

After loading suspension 502 and solution 504, end-channel open reservoirs 506 and 510 and one mid-channel, open reservoir 508 were filled with approximately the same volume (40 µl) of aqueous buffer solution in an attempt to equalize hydrostatic pressure and minimize pressure driven flow. We here use "open reservoir" to denote an inlet or outlet connection between the ambient and the microfluidic system. Unwanted small differences in the hydrostatic pressure in these open reservoirs result in unwanted pressure-driven flows in the channels which may disturb on-chip processes including chemical and biological separations and analysis.

The movement of fluorescent particles was monitored with a detector 520 disposed to image the beads in suspension 502. Detector 520 is vertically separated from the flow channel of suspension 502, although this vertical separation is not apparent in the top view of FIG. 5B. For this experiment, detector 520 was a microscope (magnification: 20×, numerical aperture: 0.5) equipped with high-sensitivity CCD (16-bit Cascade 512F). The field of view spans 1/13th of the channel width. FIG. 5A shows an exemplary image from this detector.

Particle movement was monitored before and after the open reservoir 506 content was replaced with the phase-change material (here this was 40 μl cooled, buffered, 25% Pluronic® F-127). This thermoreversible hydrogel is in a liquid state at low temperature (~4° C.) and gels at high temperature (~20° C.). The gelation temperature of this material is concentration dependent. Prepared in its inactivated state (that is, about 4° C.), Pluronic® F-127 can be mixed with appropriate electrolytes required for a specific application. The cooled solution is dispensed into the open reservoir. In less than 5 s, it reaches its gelation temperature, and seals the fluidic passage, thereby eliminating pressure driven flow.

The velocity field was evaluated using a micron-resolution particle image velocimetry (micro-PIV). Micro-PIV tracks the motions of small groups of particles to quantify velocity fields in the channels. Our experiments showed that even small variations in hydrostatic pressure cause significant pressure driven flow. The following results were all obtained by averaging the velocity vectors determined from 100 sequential images recorded at a frequency of 5 Hz.

Figure 6A:
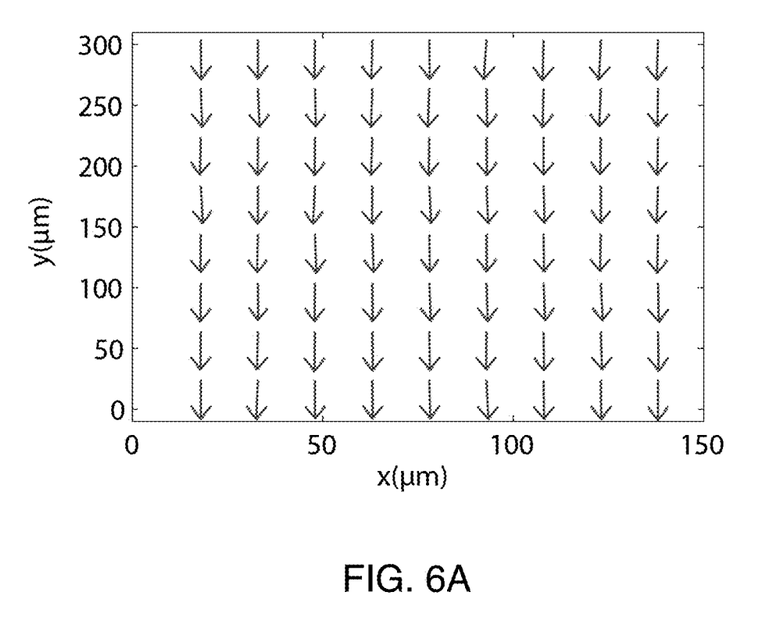
FIGS. 6A-B show results relating to the experiment of FIGS. 5A-B.
Figure 6B:
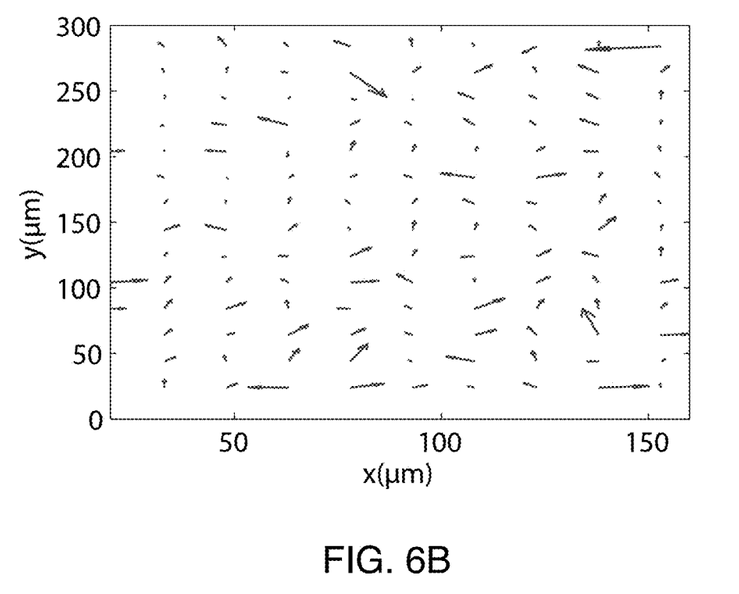

FIG. 6A shows the velocity vector field evaluated from an image sequence acquired when all open reservoirs contained purely aqueous buffering solution. The maximum velocity in this field of view is approximately 25 μm/s directed downward. FIG. 6B shows the velocity vector field evaluated from a set of images acquired 5 seconds after replacing the aqueous buffering solution in open reservoir 506 with the phase-change material as described above. The average velocity vector magnitude seen on FIG. 6B is less than about 1 μm/s. Note the viscosity, flow resistance, and electrical resistance inside the fluidic channels (in the chip) remain unchanged after the addition of the phase-change material to reservoir 506. The bulk, pressure driven flow was eliminated by simply sealing the junction between the open reservoir and the fluidic passage. The residual velocities measured after addition of the phase-change material (FIG. 6B) are due to image noise and Brownian motion of the particles. The mobilities of particles and other analytes in the channel are not affected by the seal at the open reservoir.

Figure 7:
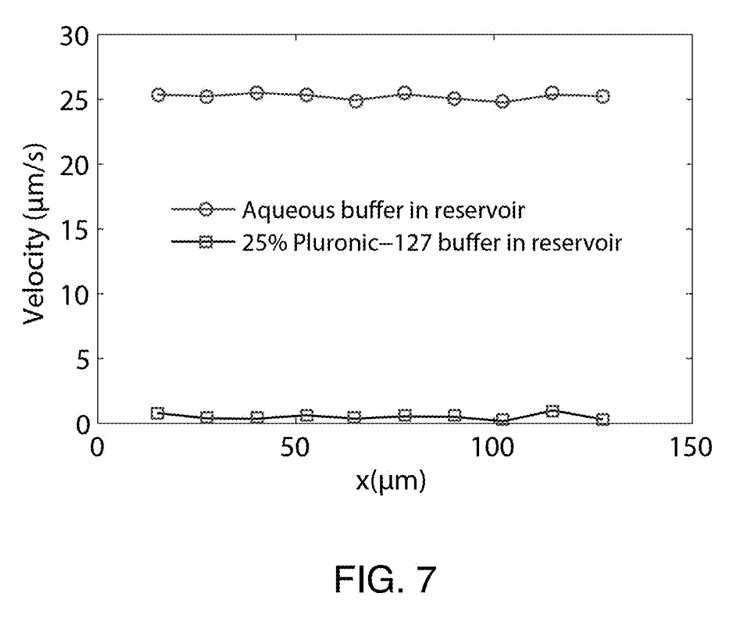
FIG. 7 shows further results relating to the experiment of FIGS. 5A-B.

Replacement of the aqueous buffer solution in open reservoir 506 with the phase-change material resulted in a dramatic reduction of the pressure driven velocity. FIG. 7 shows the reduction in the absolute velocity of particles in solution before and after addition of the phase-change material. In this experiment, the field of view of detector 520 is a small area of the channel, therefore the velocity profile looks relatively linear. In smaller channels, where the field of view spans the entire channel width, we would observe a parabolic velocity profile.

The invention claimed is:

1. A method for controlling fluid flow in a microfluidic system, the method comprising:
    loading a liquid to a microfluidic flow network, wherein the microfluidic flow network includes two or more input/output nodes connected by one or more channels, and wherein the liquid is loaded to at least a selected input/output node;
    wherein the two or more input/output nodes permit fluid to enter or leave the microfluidic flow network;
    dispensing a phase-change material in a liquid phase to at least the selected input/output node after the loading the liquid to the selected input/output node, wherein the phase-change material is distinct from the liquid; and
    transitioning the phase-change material from the liquid phase to a non-fluid phase within at least the selected input/output node, wherein the phase-change material is transitioned to the non-fluid phase in some but not all of the two or more input/output nodes;
    wherein the non-fluid phase is a gel.

2. The method of claim 1, wherein the phase-change material causes pH buffering.

3. The method of claim 1, wherein the transitioning the phase-change material from the liquid phase to the non-fluid phase is governed by temperature.

4. The method of claim 3, wherein the phase-change material is dispensed at a temperature other than ambient temperature and wherein the phase-change material transitions from the liquid phase to the non-fluid phase as its temperature approaches ambient temperature.

5. A method for sample analysis comprising:
    performing a sample analysis procedure in a microfluidic system; and
    performing the method of claim 1 wherein the phase-change material is in the non-fluid phase during the sample analysis procedure, whereby pressure-driven flow during the sample analysis procedure is reduced.

6. The method of claim 5, wherein the sample analysis procedure is selected from the group consisting of: electrophoresis, isotachophoresis, chromatography, electrochromatography, enzymatic processes, chemical reactions involving one or more species in solution, chemical reactions between a species in solution and a surface-bound species, hybridization, antibody and antigen reactions, optical analyses, electrochemical sensing, and spectral analyses.

7. A method for sample analysis comprising:
    performing a sample analysis procedure in a microfluidic system; and
    performing the method of claim 1 wherein the phase-change material is in the liquid phase during the sample analysis procedure, whereby pressure-driven flow during the sample analysis procedure is enabled.

* * * * *